(12) United States Patent
Yamasaki (10) Patent No.: US 8,681,882 B2
(45) Date of Patent: Mar. 25, 2014

(54) DATA TRANSMITTING CIRCUIT AND DATA COMMUNICATION APPARATUS (75) Inventor: Daisuke Yamasaki, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 102 days.

(21) Appl. No.: 13/392,027

(22) PCT Filed: Jun. 17, 2010

(86) PCT No.: PCT/JP2010/060294
§ 371 (c)(1),
(2), (4) Date: Feb. 23, 2012

(87) PCT Pub. No.: WO2011/024541
PCT Pub. Date: Mar. 3, 2011

(65) Prior Publication Data
US 2012/0155559 A1    Jun. 21, 2012

(30) Foreign Application Priority Data
Aug. 26, 2009    (JP) ................... 2009-195085

(51) Int. Cl.
*H04L 25/00* (2006.01)
(52) U.S. Cl.
USPC ....................................... 375/257

(58) Field of Classification Search
USPC .......... 375/257, 231, 296, 341; 370/328, 338; 455/115.1, 127.1; 326/77
See application file for complete search history.

(56) References Cited

U.S. PATENT DOCUMENTS 6,288,592 B1 * 9/2001 Gupta ........................ 327/392
2010/0321069 A1 * 12/2010 Komatsu et al. ........... 327/108

FOREIGN PATENT DOCUMENTS

| JP | 2008-278488 A | 11/2008 |
| KR | 2000-0056731 A | 9/2000 |
| WO | 2008-099523 A1 | 8/2008 |

* cited by examiner

*Primary Examiner* — Khai Tran
(74) *Attorney, Agent, or Firm* — Konomi Takeshita (57) ABSTRACT Disclosed herein are a data transmission circuit and a data communication device that transmit data using an Alternating Current (AC)-coupled transmission line. The data transmission circuit includes a data transmission unit for transmitting data via a transmission line having a single AC-coupled line or a plurality of AC-coupled lines. When transmitting data, the data transmission unit transmits the data via the transmission line by sequentially setting a first electric potential corresponding to the data and a second electric potential different from the first electric potential. When transitioning from data transmission mode to an idle state, the data transmission unit sets an intermediate electric potential between the first electric potential and the second electric potential.

14 Claims, 11 Drawing Sheets

DATA TRANSMITTING CIRCUIT AND DATA COMMUNICATION APPARATUS

FIELD OF THE INVENTION

The present invention relates generally to a data transmission circuit and a data communication device that transmit data using an Alternating Current (AC)-coupled transmission line.

BACKGROUND OF THE INVENTION

Presently, mainstream display interfaces are digital display interfaces. For example, AC-coupled transmission lines are used as transmission lines that are capable of transmitting digital image data at high speed. An example of a data communication system 2000 including a transmitter Tx 2100 and a receiver Rx 2200 using such a transmission line is illustrated in FIG. 12.

Figure 12:
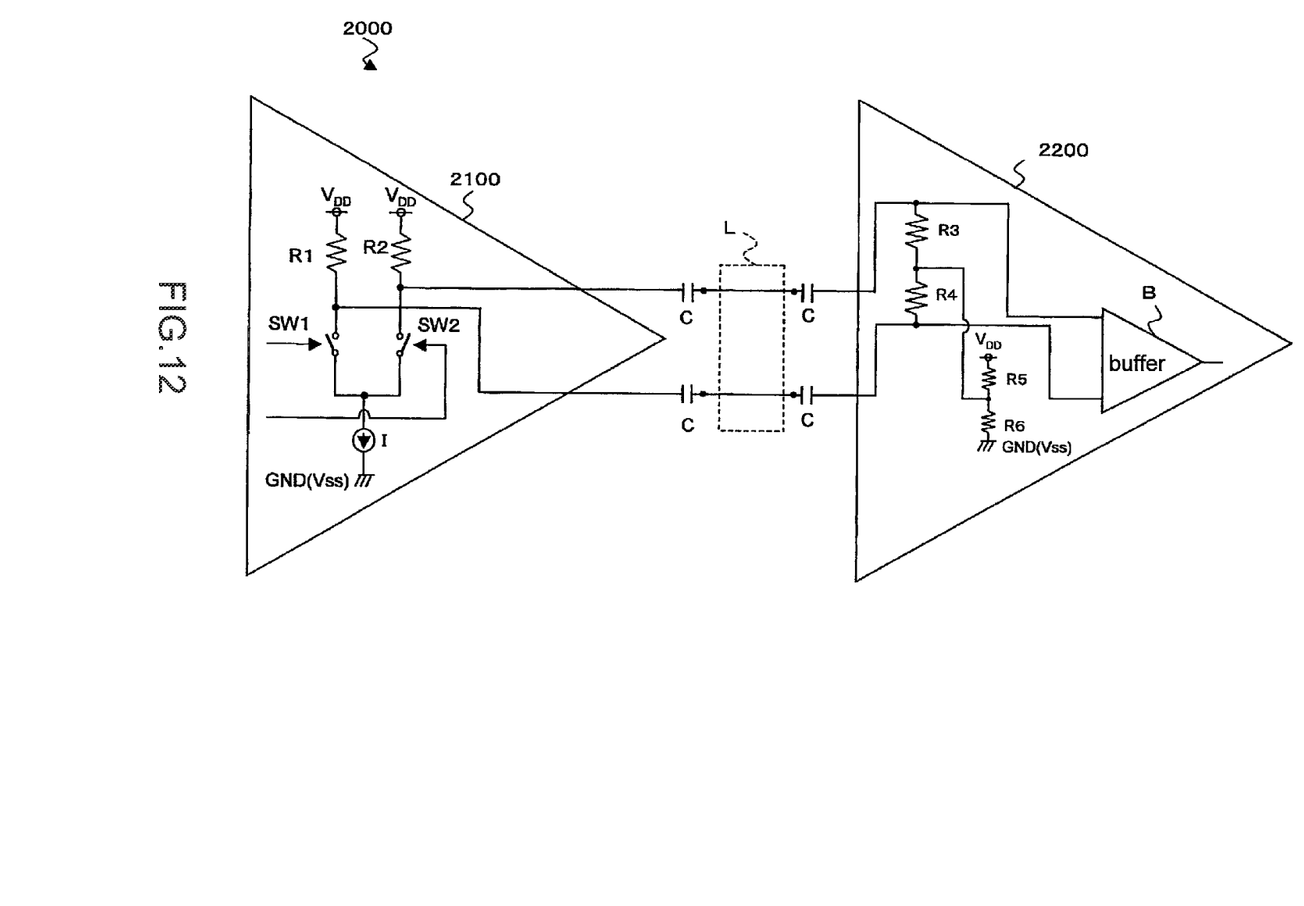
FIG. 12 is a diagram illustrating the schematic configuration of a conventional data communication system.

The transmitter Tx 2100 and the receiver Rx 2200 illustrated in FIG. 12 are connected to each other by an AC-coupled transmission line L. Capacitors C are connected in series on the transmitter output terminal sides and receiver input terminal sides of respective lines of the transmission line L. These capacitors C are used for AC coupling that blocks a Direct Current (DC) component contained in serial data being transmitted via the transmission line L.

The transmitter Tx 2100 is a circuit that transmits input serial data via the transmission line L over the amplitude of voltage set by resistors R1 and R2 and a current source I by controlling the ON/OFF operation of switches SW1 and SW2. The resistance values of the resistors R1 and R2 are all set to, for example, 50Ω, and are matched with the characteristic impedance on the transmission line L.

The receiver Rx 2200 is a circuit that receives serial data via the transmission line L using resistors R3, R4, R5 and R6 and a buffer B. The resistance values of the resistors R3 and R4 are all set to, for example, 50Ω, and are matched with the characteristic impedance on the transmission line L. The resistance values of the resistors R5 and R6 are all the same or have a predetermined voltage division ratio, and an electric potential in a voltage range which can be detected by the buffer B is set. Serial data can be stably input to the buffer B by the setting of the electric potential.

Furthermore, although FIG. 12 illustrates an example of a simplex data communication system in which serial data is transmitted from the transmitter Tx 2100 to the receiver Rx 2200, a bidirectional data communication system may be constructed by installing the same transmitter Tx and receiver Rx on each of both sides.

A conventional bidirectional display interface using an AC-coupled transmission line was disclosed in, for example, Japanese Unexamined Patent Publication No. 2008-278488. In this patent publication, there was proposed a digital display interface that enabled a plurality of data streams in different formats to be multiplexed and then transmitted.

In the conventional display interface using an AC-coupled transmission line, when the transmitter Tx starts communication from an idle state, there is a period in which a SYNC pattern is transmitted to a receiver Rx and the DC balance is adjusted. Accordingly, the period in which the DC balance is adjusted becomes an overhead. Furthermore, in the data communication system 2000 including the transmitter Tx 2100 and the receiver Rx 2200 illustrated in FIG. 12, a circuit including a plurality of resistors is provided in each of the transmitter Tx and the receiver Rx, and therefore circuit areas and power consumption are increased particularly when the data communication system 2000 is applied to a bidirectional data communication system.

SUMMARY OF THE INVENTION

Accordingly, the present invention has been made keeping in mind the above problems occurring in the prior art, and an object of the present invention is to provide a data transmission circuit and a data communication device that do not transmit a SYNC pattern and render the period it takes to adjust the DC balance unnecessary, thereby reducing the time it takes to start communication from an idle state and further reducing power consumption.

In accordance with an aspect of the present invention, there is provided a data transmission circuit, including a data transmission unit for transmitting data via a transmission line having a single AC-coupled line or a plurality of AC-coupled lines; wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential.

In accordance with an aspect of the present invention, there is provided a data transmission circuit, including a data transmission unit for transmitting normal and reversed phase differential data via a differential transmission line having two AC-coupled lines; wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential.

In accordance with an aspect of the present invention, there is provided a data communication device, including a data transmission circuit including a data transmission unit for transmitting data via a transmission line having a single AC-coupled line or a plurality of AC-coupled lines, and a data reception circuit including a data reception unit for receiving data via the transmission line; wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential and supplies the intermediate electric potential to the transmission line and the data reception unit.

In accordance with an aspect of the present invention, there is provided a data communication device, including a data transmission circuit including a data transmission unit for transmitting normal and reversed phase differential data via a differential transmission line having two AC-coupled lines, and a data reception circuit including a data reception unit for receiving data via the differential transmission line; wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential and supplies the intermediate electric potential to the differential transmission line and the data reception unit.

In accordance with the present invention, there are provided a data transmission circuit and a data communication device that render the period in which the DC balance is adjusted unnecessary because a SYNC pattern is not transmitted, thereby reducing a period up to the time communication starts from an idle state and further reducing the power consumption.

BRIEF DESCRIPTION OF THE DRAWINGS

The above and other objects, features and advantages of the present invention will be more clearly understood from the following detailed description taken in conjunction with the accompanying drawings, which illustrate, by way of example, the principles of the invention.

FIG. 7 is a diagram illustrating transmission waveforms, wherein FIG. 7(a) is a diagram illustrating an example of a transmission waveform of a conventional transmitter Tx, FIG. 7(b) is a diagram illustrating another example of a transmission waveform of the conventional transmitter Tx, and FIG. 7(c) is an example of a transmission waveform of the transmitter Tx according to the first embodiment;

FIG. 8 is a diagram illustrating reception waveforms, wherein FIG. 8(a) is a diagram illustrating an example of a reception waveform of a conventional receiver Rx, FIG. 8(b) is a diagram illustrating another example of a reception waveform of the conventional receiver Rx, and FIG. 8(c) is an example of a reception waveform of the receiver Rx according to the first embodiment;

DETAILED DESCRIPTION OF THE INVENTION

Reference now should be made to the drawings, in which the same reference numerals are used throughout the different drawings to designate the same or similar components.

Data transmission circuits and data communication devices using AC-coupled transmission lines according to embodiments of the present invention will be described in detail below with reference to the accompanying drawings.

(First Embodiment)

Figure 1:
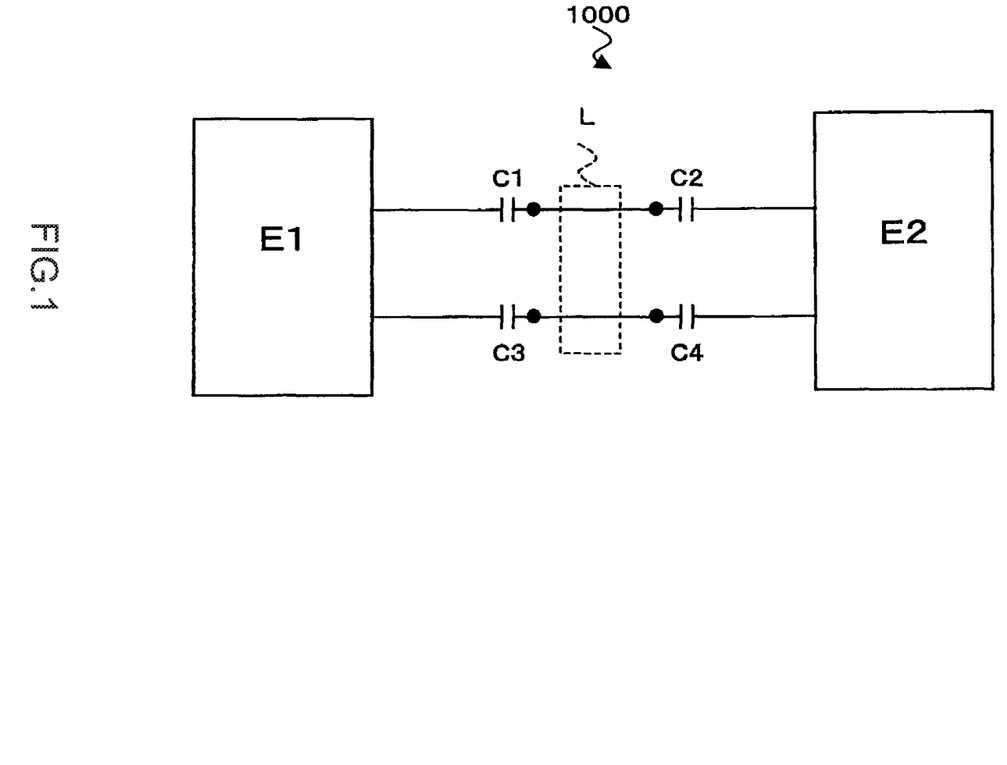
FIG. 1 is a diagram illustrating the schematic configuration of a data communication system according to a first embodiment of the present invention.

FIG. 1 is a diagram illustrating the schematic configuration of a data communication system 1000 according to a first embodiment of the present invention. Referring to FIG. 1, the data communication system 1000 comprises a first communication device E1 and a second communication device E2. The first communication device E1 and the second communication device E2 are connected to each other by an AC-coupled two-wire transmission line L. Capacitors C1 and C3 are connected in series on the first communication device sides of respective lines of the transmission line L, and capacitors C2 and C4 are connected in series on the second communication device sides of respective lines of the transmission line L. These capacitors C1~C4 are used for AC coupling that blocks a DC component included in data being transmitted via the transmission line L.

Figure 2:
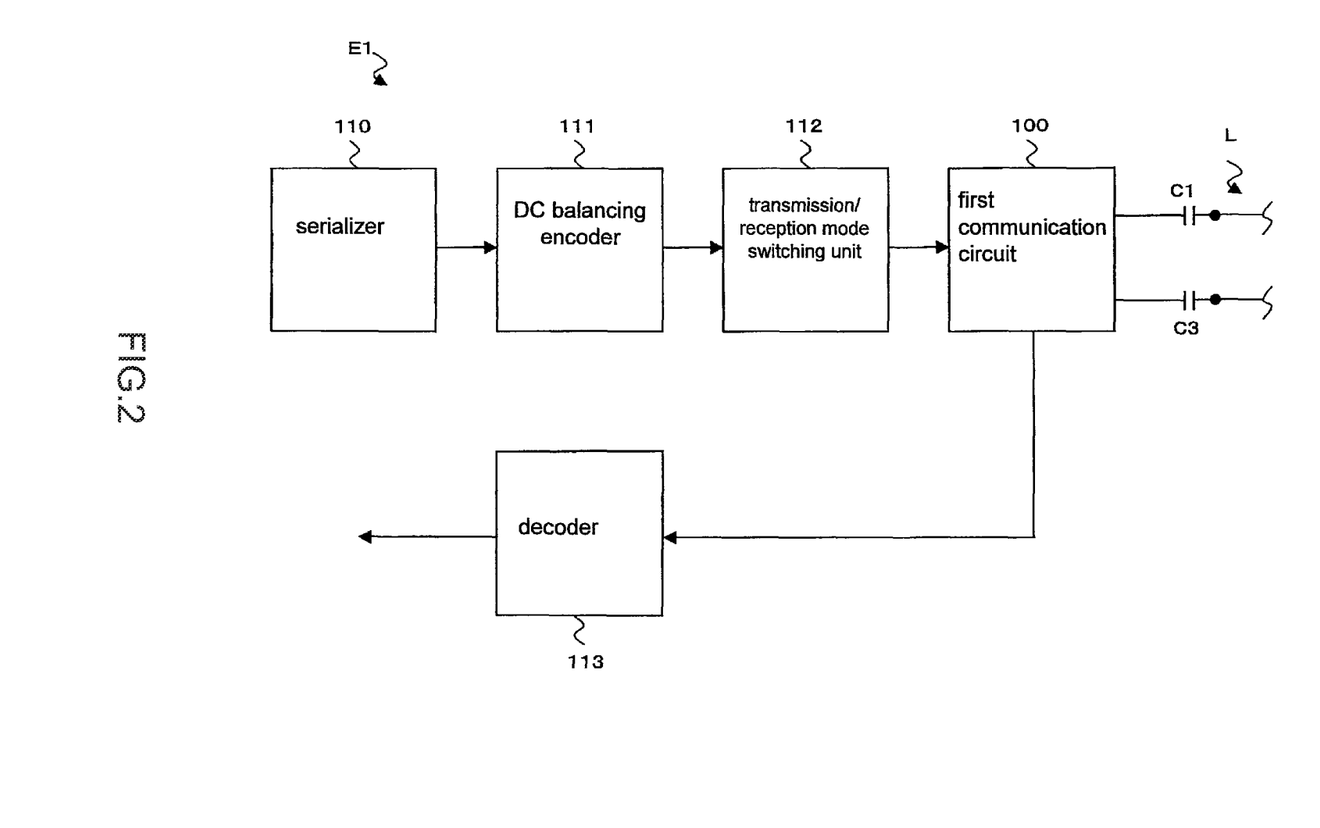
FIG. 2 is a diagram illustrating the schematic configuration of the first communication device of FIG. 1.

FIG. 2 is a diagram illustrating the schematic configuration of the first communication device E1 of FIG. 1. Referring to FIG. 2, the first communication device E1 comprises a serializer 110, a DC balancing encoder 111, a transmission/reception mode switching unit 112, a first communication circuit 100, and a decoder 113. The serializer 110 converts data to be transmitted into serial data by packetizing the data. The DC balancing encoder 111 converts the high and low levels of the resulting serial data into serial data whose DC balance has been achieved. The transmission/reception mode switching unit 112 controls the ON/OFF operation of the switches (which will be described later) of the first communication circuit 100 in data transmission mode and in data reception mode. The first communication circuit 100 performs control so that the voltage amplitude of serial data transmitted to and received from the second communication device E2 via the transmission line L is kept constant. The decoder 113 decodes and outputs serial data received by the first communication circuit 100.

Figure 3:
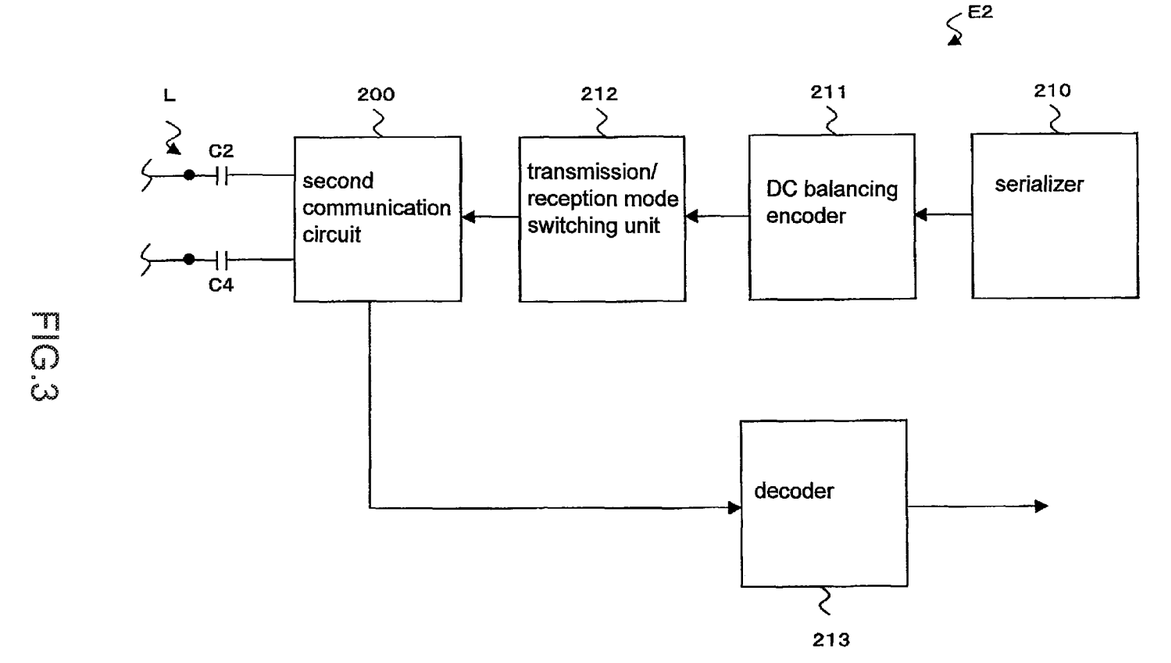
FIG. 3 is a diagram illustrating the schematic configuration of the second communication device of FIG. 1.

FIG. 3 is a diagram illustrating the schematic configuration of the second communication device E2 of FIG. 1. Referring to FIG. 3, the second communication device E2 comprises a serializer 210, a DC balancing encoder 211, a transmission/reception mode switching unit 212, a second communication circuit 200, and a decoder 213. Since the configuration of FIG. 3 is the same as that of FIG. 2, a description of the configuration of FIG. 3 is omitted here.

Figure 4:
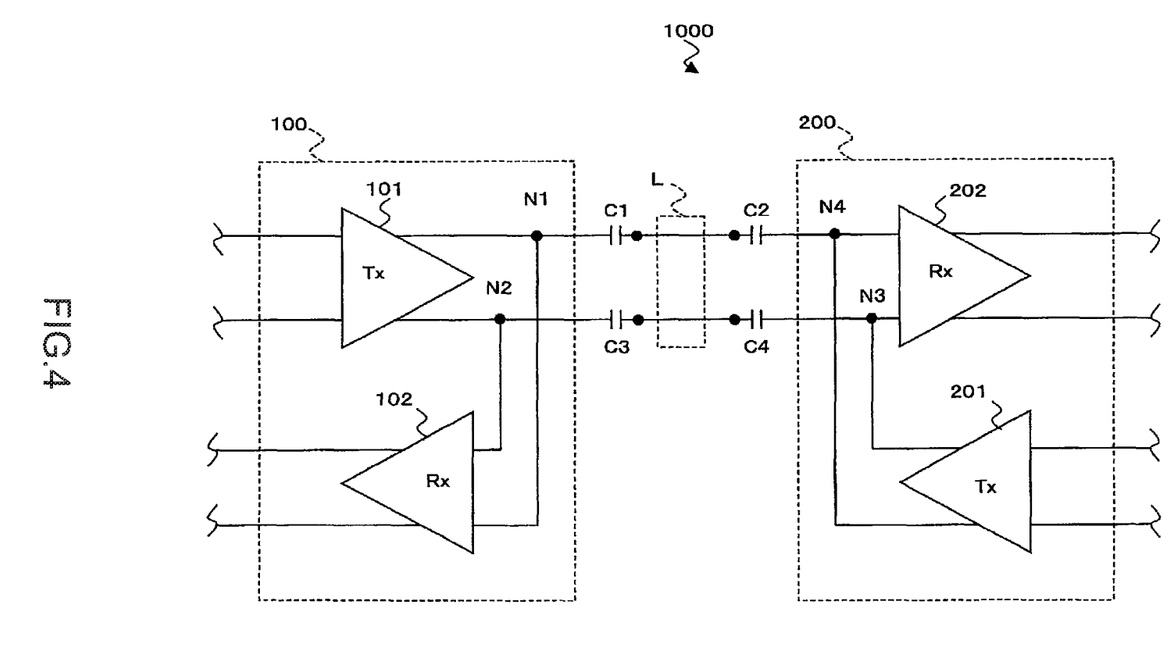
FIG. 4 is a diagram illustrating the schematic configurations of the first communication circuit and the second communication circuit according to the first embodiment.

FIG. 4 is a diagram illustrating the schematic configuration of the first communication circuit 100 and the second communication circuit 200. Referring to FIG. 4, the first communication circuit 100 includes a transmitter Tx 101 and a receiver Rx 102, and the second communication circuit 200 includes a transmitter Tx 201 and a receiver Rx 202. Furthermore, in the first communication circuit 100, the inputs of the receiver Rx 102 are connected in parallel to the outputs of the transmitter Tx 101. In the second communication circuit 200, the outputs of the transmitter Tx 201 are connected in parallel to the inputs of the receiver Rx 202.

Figure 5:
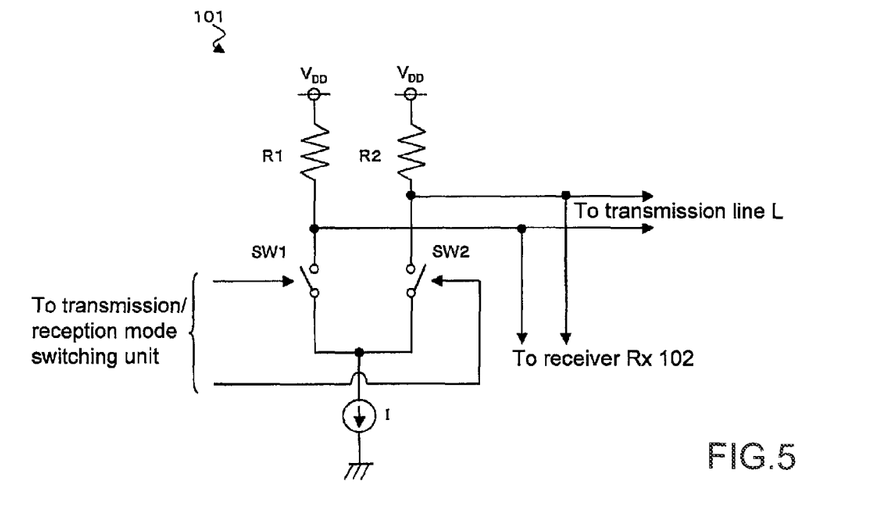
FIG. 5 is a diagram illustrating the circuit configuration of the transmitter Tx of FIG. 4.

FIG. 5 is a diagram illustrating an example of the circuit configuration of the transmitter Tx 101 illustrated in FIG. 4. Referring to FIG. 5, the transmitter Tx 101 includes resistors R1 and R2, switches SW1 and SW2, and a current source I. The first ends of the resistors R1 and R2 are connected to a DC power source $V_{dd}$, and the second ends of resistors R1 and R2 are connected to the switches SW1 and SW2, respectively. The first ends of the switches SW1 and SW2 are connected to the second ends of the resistors R1 and R2, respectively, and the second ends of the switches SW1 and SW2 are connected to the current source I. The movable contacts of the switches SW1 and SW2 are connected to the transmission/reception mode switching unit 112 that controls an ON/OFF operation.

The first end of the current source I is connected to the second ends of the switches SW1 and SW2, and the second end of the current source I is grounded. Furthermore, the second ends of the resistors R1 and R2 are further connected to respective lines of the transmission line L. Since the transmitter Tx 201 of the second communication circuit 200 has the same configuration as the transmitter Tx 101 of the first communication circuit 100 illustrated in FIG. 5, the illustration of the transmitter Tx 201 and a description of the configuration thereof are omitted here.

Figure 6:
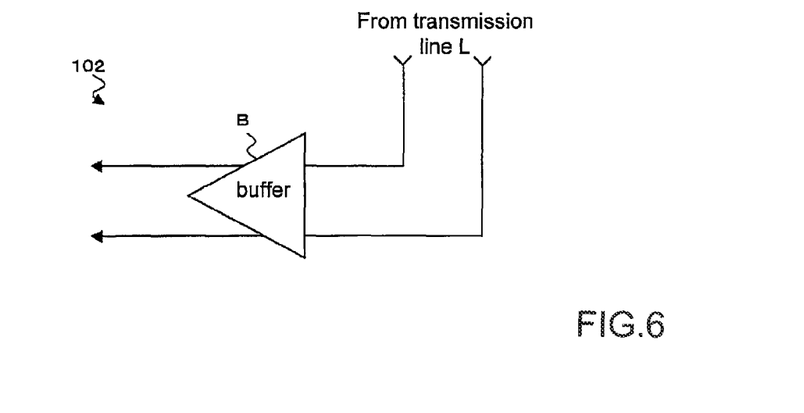
FIG. 6 is a diagram illustrating the circuit configuration of the receiver Rx of FIG. 4.

FIG. 6 is a diagram illustrating an example of the circuit configuration of the receiver Rx 102 illustrated in FIG. 4. The receiver Rx 102 includes a buffer B. Referring to FIG. 6, the buffer B receives data from the transmitter Tx 201 of the second communication circuit 200 via the transmission line L, and outputs the data to the decoder 113. Furthermore, since the receiver Rx 202 of the second communication circuit 200 has the same circuit configuration as the receiver Rx 102 of FIG. 6, the illustration of the receiver Rx 202 and a description of the configuration thereof are omitted.

The ON/OFF operation of the switches SW1 and SW2 of the transmitter Tx 101 of the first communication circuit 100 illustrated in FIG. 5 is controlled by the transmission/reception mode switching unit 112. The ON/OFF operation of the switches SW1 and SW2 is controlled in response to data transmission mode and data reception mode. In data transmission mode, the switches SW1 and SW2 are alternately turned on, and therefore the resistors R1 and R2 are alternately connected to the current source I. By the above operation of the switches SW1 and SW2, a first electric potential (for example, +electric potential) set by the resistor R1 and the current source I, and a second electric potential (for example, −electric potential) set by the resistor R2 and the current source I are supplied to respective lines of the transmission line L. That is, the transmitter Tx 101 transmits serial data via the transmission line L using a differential operation. The resistance values of the resistors R1 and R2 are all set to, for example, 50Ω, and are matched with the characteristic impedance on the transmission line L. The above operation of the data transmission mode of the transmitter Tx 101 of the first communication circuit 100 is the same as that of the transmitter Tx 201 of the second communication circuit 200.

Furthermore, both the switches SW1 and SW2 of the transmitter Tx 101 are turned on when the first communication circuit 100 transitions from data transmission mode to an idle state. In this case, a voltage division circuit that has divisional electric potentials at junctions between the resistors R1 and R2 and the current source I is formed. Since the resistance values of the resistors R1 and R2 are the same, an intermediate electric potential between the first electric potential and the second electric potential is supplied to the lines of the transmission line L. Furthermore, the above voltage division circuit is connected to the input terminals of the buffer B in the receiver Rx 102. Therefore, the intermediate electric potential is also provided to the input terminals of the buffer B. Furthermore, when the transition from the idle state to data reception mode is performed, the ON state of both the switches SW1 and SW2 is maintained, and the supply of the intermediate electric potential to the transmission line L and the input terminals of the buffer B is also maintained.

The receiver Rx 102 receives serial data from the transmitter Tx 201 via the transmission line L using the buffer B, and outputs the serial data to the decoder 113. Furthermore, the receiver Rx 202 receives serial data from the transmitter Tx 101 via the transmission line L using the buffer B, and outputs the serial data to the decoder 213.

Furthermore, in the receiver Rx 102, the intermediate electric potential obtained by the voltage division of the resistors R1 and R2 is supplied to the input terminals of the buffer B by a switch of the transmitter Tx 101 to data reception mode. In this state, the receiver Rx 102 receives the data from the transmitter Tx 201 via the transmission line L Likewise, the receiver Rx 202 receives serial data, with the intermediate electric potential being supplied to the input terminals of the buffer B by a switch of the transmitter Tx 201 to data reception mode.

The first communication circuit 100 connects the circuit configuration of the transmitter Tx 101, illustrated in FIG. 5, to the input terminals of the buffer B of the receiver Rx 102, illustrated in FIG. 6, in data reception mode, thereby rendering the resistance circuit of the receiver Rx 102 unnecessary Likewise, the second communication circuit 200 also connects the resistance circuit of the transmitter Tx 201 to the input terminals of the buffer B of the receiver Rx 202 in data reception mode, thereby rendering the resistance circuit of the receiver Rx 202 unnecessary. Thanks to this circuit configuration, the first communication circuit 100 and the second communication circuit 200 do not require the resistance circuits of the receivers Rx 102 and 202, and therefore the circuit areas of the first and second communication circuits 100 and 200 can be reduced.

The data communication operation of the conventional data communication system 2000 and the data communication operation of the data communication system 1000 according to the first embodiment of the present invention will be compared with each other.

First, the communication operation of the data communication system 2000 illustrated in FIG. 12 will be described. In the conventional data communication system 2000, the switches SW1 and SW2 of the transmitter Tx 2100 are alternately turned on, and the resistors R1 and R2 are alternately connected to the current source I. By the above operation of the switches SW1 and SW2, the first electric potential (for example, +electric potential) set by the resistor R1 and the current source I, and the second electric potential (for example, −electric potential) set by the resistor R2 and the current source I are supplied to respective lines of a transmission line L. That is, serial data input to the transmitter Tx 2100 is transmitted via the transmission line L by the differential operation of the transmitter Tx 2100. The serial data transmitted from the transmitter Tx 2100 is received by the receiver Rx 2200 via the transmission line L. The receiver Rx 2200 sets the intermediate electric potential using either the resistor R3 or the resistor R4 and the voltage division resistors R5 and R6, and inputs the received serial data into the buffer B.

An operation that is performed when communication is started from an idle state in the conventional data communication system 2000 will be described. When communication is started from an idle state, the transmitter Tx 2100 transmits a SYNC pattern, intended to stabilize communication operation (the amplitude of voltage), to a receiver Rx via the transmission line L. In this case, the operation of the switches SW1 and SW2 of the transmitter Tx 2100 is the same as when data is transmitted as described above. The operation of the receiver Rx 2200 that has received the SYNC pattern is the same as when data is received as described above. That is, in the conventional data communication system 2000, when a communication operation is started from an idle state, a period is required in which the electric potential within the transmitter Tx 2100 and the electric potential within the receiver Rx 2200 all have converged into the intermediate electric potential in an operating range. Accordingly, when communication is started from an idle state, the conventional data communication system 2000 needs to set a period in which a SYNC pattern will be transmitted for a predetermined period and a communication operation will be stabilized.

Next, a communication operation in the data communication system 1000 according to the first embodiment of the present invention illustrated in FIG. 4 will be described. In the data communication system 1000, the switches SW1 and SW2 of the transmitter Tx 101 are alternately turned on by the transmission/reception mode switching unit 112. The resistors R1 and R2 are alternately connected to the current source I by the operation of the switches SW1 and SW2. By this operation, a first electric potential (for example, +electric potential) set by the resistor R1 and the current source I and a second electric potential (for example, −electric potential) set by the resistor R2 and the current source I are supplied to respective lines of the transmission line L. That is, a differential operation is performed within the transmitter Tx 101. Serial data input from the transmitter Tx 101 is transmitted via the transmission line L by the differential operation within the transmitter Tx 101. Serial data transmitted from the transmitter Tx 101 is received by the receiver Rx 202 via the transmission line L. In the receiver Rx 202, the intermediate electric potential supplied by the transmitter Tx 201 is supplied to the input terminals of the buffer B. In the receiver Rx 202, the received serial data is stably input to the input terminal of the buffer B by the above supply of the intermediate electric potential.

An operation that is performed when the transition from data transmission mode to an idle state is performed in the data communication system 1000 of the first embodiment will be described. When the transition from data transmission mode to an idle state is performed, both the switches SW1 and SW2 of the transmitter Tx 101 in the first communication circuit 100 are turned on. In this case, a voltage division circuit that has divisional electric potentials at junctions between the resistors R1 and R2 and the current source I is formed. The resistance values of the resistors R1 and R2 are the same, and therefore the intermediate electric potential between the first electric potential and the second electric potential is supplied to respective lines of the transmission line L. Furthermore, this voltage division circuit is connected to the input terminals of the buffer B within the receiver Rx 102. On this account, the intermediate electric potential is also supplied to the input terminals of the buffer B. Furthermore, when the transition from an idle state to data reception mode is performed, the ON state of both the switches SW1 and SW2 is maintained, and the supply of the intermediate electric potential to the transmission line L and the input terminals of the buffer B is also maintained. In this state, the receiver Rx 102 receives data from the transmitter Tx 201 via the transmission line L. That is, in the data communication system 1000 of the first embodiment, when the transition from data transmission mode to an idle state is performed and when a communication operation is started from an idle state, the electric potential within the transmitter Tx 101 and the electric potential within the receiver Rx 102 are all set to the intermediate electric potential. The same operation is performed in the second communication circuit 200. On this account, in the data communication system 1000 of the first embodiment, it is not necessary to set a period in which a communication operation is stabilized (a DC balance is achieved), and the operation of transmitting and receiving a SYNC pattern is not necessary. On this account, in the data communication system 1000 of the first embodiment, when a communication operation is started from an idle state, serial data can be immediately transmitted and received.

In the conventional data communication system 2000, when communication is started from an idle state, a period in which a SYNC pattern is transmitted or received is set for each of the transmitter Tx 2100 and the receiver Rx 2200 in order to stabilize a communication operation. On this account, in the conventional data communication system 2000, the period it takes to start communication from an idle state is required and power consumption is increased, these being the problems which the present invention was devised to solve.

The data communication system 1000 of the first embodiment is characterized in that the transmitter Tx sets the intermediate electric potential and then supplies the intermediate electric potential to the transmission line L and the receiver Rx when the transition from data transmission mode to an idle state is performed and when a communication operation is started from an idle state. By doing so, the period it takes to stabilize a communication operation at the transmitter Tx and the receiver Rx and the transmission of a SYNC pattern are rendered unnecessary.

Next, an example of a case where communication is started from an idle state will be described with reference to FIGS. 7(a)–7(c) and FIGS. 8(a)–8(c).

Figure 7:
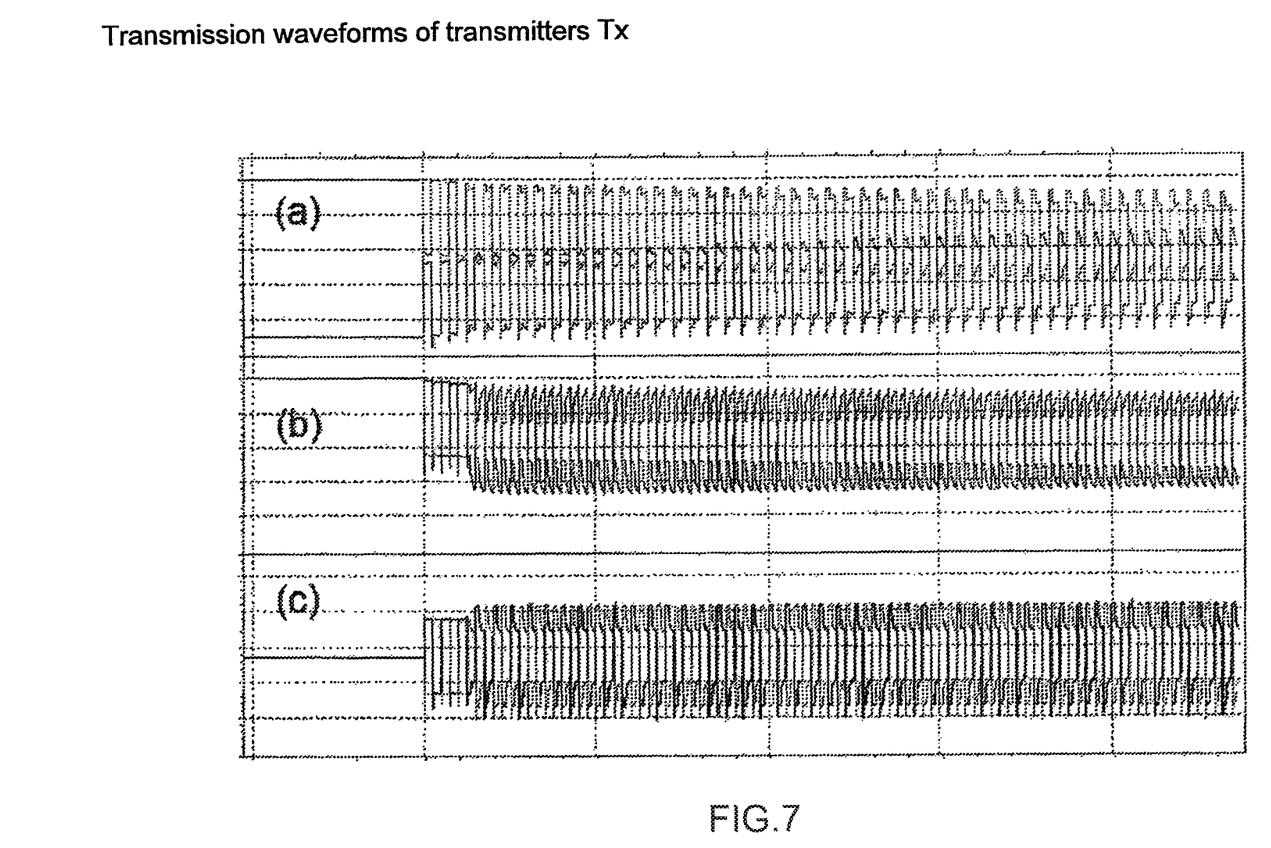

FIGS. 7(a)–7(c) illustrate the waveforms of SYNC patterns transmitted by the transmitter Tx of the conventional data communication system, and the waveform of serial data transmitted by the transmitter Tx of the data communication system according to the present embodiment. FIG. 7(a) illustrates an example of the waveform of the SYNC pattern that is output by the transmitter Tx 2100 when communication is started from an idle state in the conventional data communication system 2000. This case illustrates the example in which the transmitter Tx 2100 alternately turns on the switches SW1 and SW2, thereby outputting the SYNC pattern while supplying a high electric potential and a low electric potential to respective lines of the transmission line L. This operation requires a period up to the time a link with the receiver Rx 2200 has been reestablished because a period up to the time respective electric potentials of the SYNC pattern transmitted to the respective lines have converged into the intermediate electric potential is necessary.

FIG. 7(b) illustrates another example of the waveform of the SYNC pattern that is output by the transmitter Tx 2100 when communication is started from an idle state in the conventional data communication system 2000. In this case, the transmitter Tx 2100 turns on either the switch SW1 or the switch SW2, thereby outputting the SYNC pattern while supplying a high electric potential to respective lines of the transmission line L. This operation requires a period up to the time a link with the receiver Rx 2200 has been reestablished because a period up to the time respective electric potentials of the SYNC pattern transmitted to the respective lines have converged into the intermediate electric potential is necessary.

FIG. 7(c) illustrates an example of the waveform of the serial data that is output by the transmitter Tx 101 or transmitter Tx 201 when communication is started from an idle state in the data communication system 1000 according to the first embodiment. In this case, the transmitter Tx 101 or transmitter Tx 201 outputs serial data while supplying the intermediate electric potential to respective lines of the transmission line L and the receiver Rx 102 or receiver Rx 202 using the operation of turning on both the switches SW1 and SW2. This operation does not require a period in which a link with the receiver Rx is reestablished because the electric potentials of the serial data to be transmitted to the respective lines are set to the intermediate electric potential first.

The cases of FIGS. 7(a) and 7(b) require a period up to the time the SYNC pattern has been transmitted to the receiver Rx and a link with the receiver Rx has been also reestablished when communication is started from an idle state in the conventional data communication system 2000. That is, a period is required because the electric potential of the transmitter Tx converges into the intermediate electric potential intended to stabilize the communication operation during a period in which the SYNC pattern is transmitted and received. In the case of FIG. 7(c), when communication is started from an idle state in the data communication system 1000 of the first embodiment, the intermediate electric potential is supplied to respective lines of the transmission line L and the receiver Rx by the operation of turning on both the switches SW1 and SW2 of the transmitter Tx 101 or transmitter Tx 201. On this account, a period is made unnecessary by causing the electric potentials of the transmitter Tx to converge into the intermediate electric potential intended to stabilize the communication operation, thereby enabling serial data to be immediately transmitted. The communication operation is stabilized by setting the intermediate electric potential at the transmitter Tx, and therefore the transmission of a SYNC pattern is made unnecessary, thereby reducing a period in which a link with the receiver Rx 102 or receiver Rx 202 is reestablished.

Figure 8:
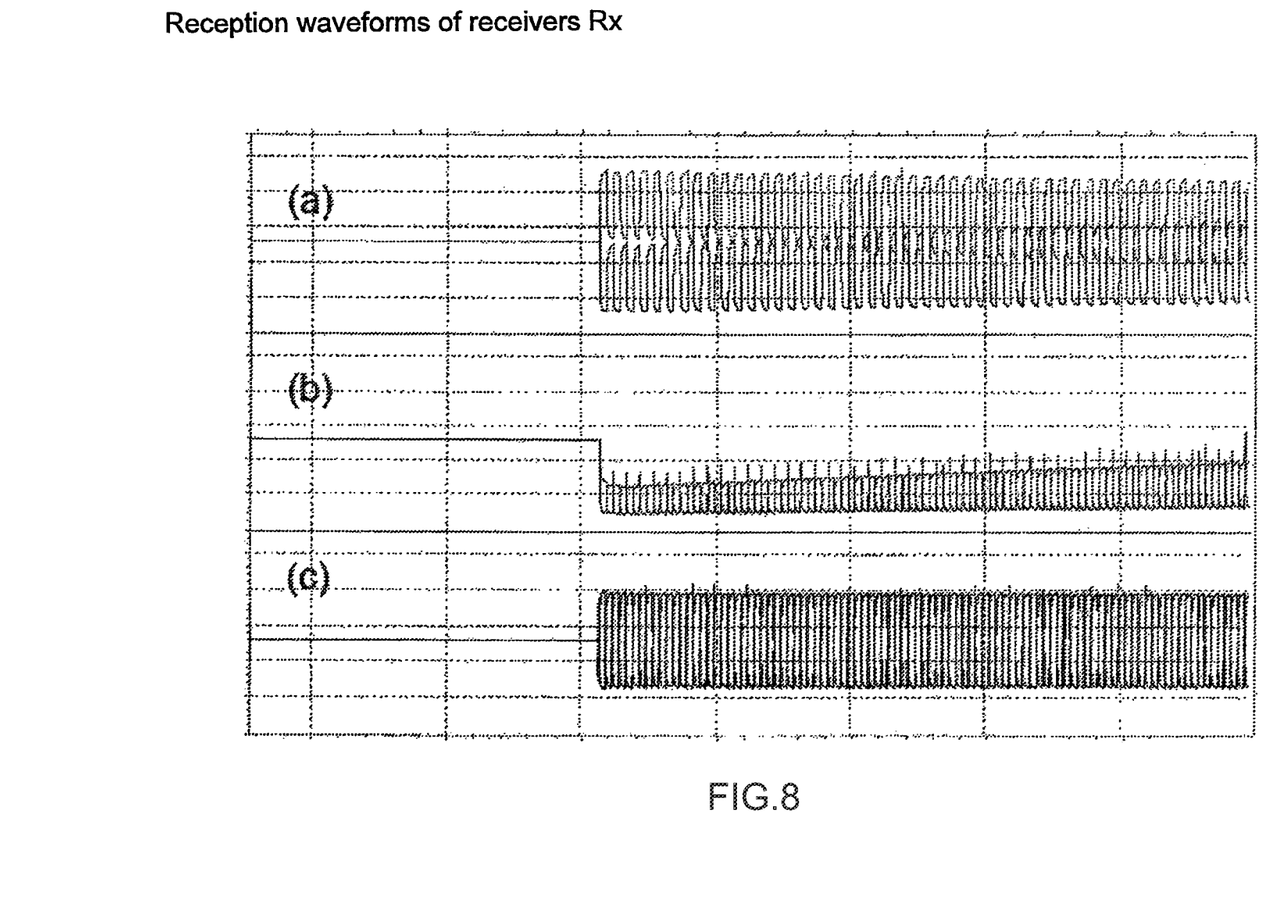

FIGS. 8(a)~8(c) illustrate the waveforms of SYNC patterns received by the receiver Rx of the conventional data communication system, and the waveform of serial data received by the receiver Rx of the data communication system according to the present embodiment. FIG. 8(a) illustrates the waveform of the SYNC pattern of FIG. 7(a) that is received by the receiver Rx 2200 via the transmission line L in the conventional data communication system 2000. In this case, in the receiver Rx 2200, the electric potentials of the input terminals of the buffer B are gradually set to the intermediate electric potential by a resistance circuit including the resistors R3~R6 illustrated in FIG. 12. This operation requires a period up to the time a link with the transmitter Tx 2100 has been reestablished because a period up to the time the electric potentials have converged into the intermediate electric potential at which the buffer B can operate is necessary.

FIG. 8(b) illustrates the waveform of the SYNC pattern of FIG. 7(b) that is received by the receiver Rx 2200 over the transmission line L in the conventional data communication system 2000. In this case, in the receiver Rx 2200, the electric potentials of the input terminals of the buffer B are gradually set to the intermediate electric potential by the resistance circuit including the resistors R3~R6 illustrated in FIG. 12. This operation requires a period up to the time a link with the transmitter Tx 2100 has been reestablished because a period up to the time the electric potentials have converged into the intermediate electric potential at which the buffer B can operate is required.

FIG. 8(c) illustrates the waveform of the serial data of FIG. 7(c) that is received by the receiver Rx 202 or receiver Rx 102 via the transmission line L in the data communication system 1000 of the first embodiment. In this case, the intermediate electric potential is supplied to the input terminals of the buffer B of the receiver Rx 102 or receiver Rx 202 by the operation of turning on both the switches SW1 and SW2 of the transmitter Tx 101 or transmitter Tx 201. On this account, when communication is started from an idle state, the input terminals of the buffer B of the receiver Rx 102 or receiver Rx 202 can be immediately stabilized, and therefore the time it takes to reestablish a line with the transmitter Tx 101 or transmitter Tx 201 can be reduced.

In the conventional data communication system 2000 illustrated in FIGS. 7(a) and (b) and FIGS. 8(a) and (b), the amplitude of the voltage of the SYNC pattern transmitted from the transmitter Tx 2100 is not stabilized. On this account, a period up to the time the electric potential of the transmitter Tx 2100 and the electric potentials of the input terminals of the buffer B in the receiver Rx 2200 have converged into the intermediate electric potential is necessary.

In the data communication system 1000 of the first embodiment illustrated in FIGS. 7(c) and FIG. 8(c), the intermediate electric potential obtained by the voltage division of the resistance circuit within the transmitter Tx 101 or transmitter Tx 201 is supplied to respective lines of the transmission line L and the input terminals of the buffer B of the receiver Rx 102 or the receiver Rx 202. On this account, the electric potential of the transmitter Tx 101 or transmitter Tx 201 and the electric potential of the receiver Rx 102 or receiver Rx 202 are immediately set to the intermediate electric potential, and therefore a period up to the time serial data communication has been resumed can be considerably reduced.

As described above, in the data communication system 1000 of the first embodiment, when the transition from data transmission mode to an idle state is performed and when a communication operation is started from an idle state, intermediate electric potential is set at the transmitter Tx, and the intermediate electric potential is supplied to respective lines of the transmission line L and the receiver Rx. On this account, the operation of transmitting and receiving a SYNC pattern between the transmitter Tx and the receiver Rx and reestablishing a link is unnecessary. As a result, communication can be started from an idle state within a short period, and the power consumption of both the transmitter Tx and the receiver Rx can be reduced. Furthermore, the resistance circuit of the receiver Rx is not required, and therefore the circuit areas of the first and second communication circuits 100 and 200 can be reduced. Furthermore, in the data communication system 1000 of the first embodiment, a SYNC pattern is not transmitted in an idle state, and therefore the amount of electromagnetic noise generated can be reduced, thereby being effective in coping with Electro magnet Interference (EMI).

(Second Embodiment)

Figure 9:
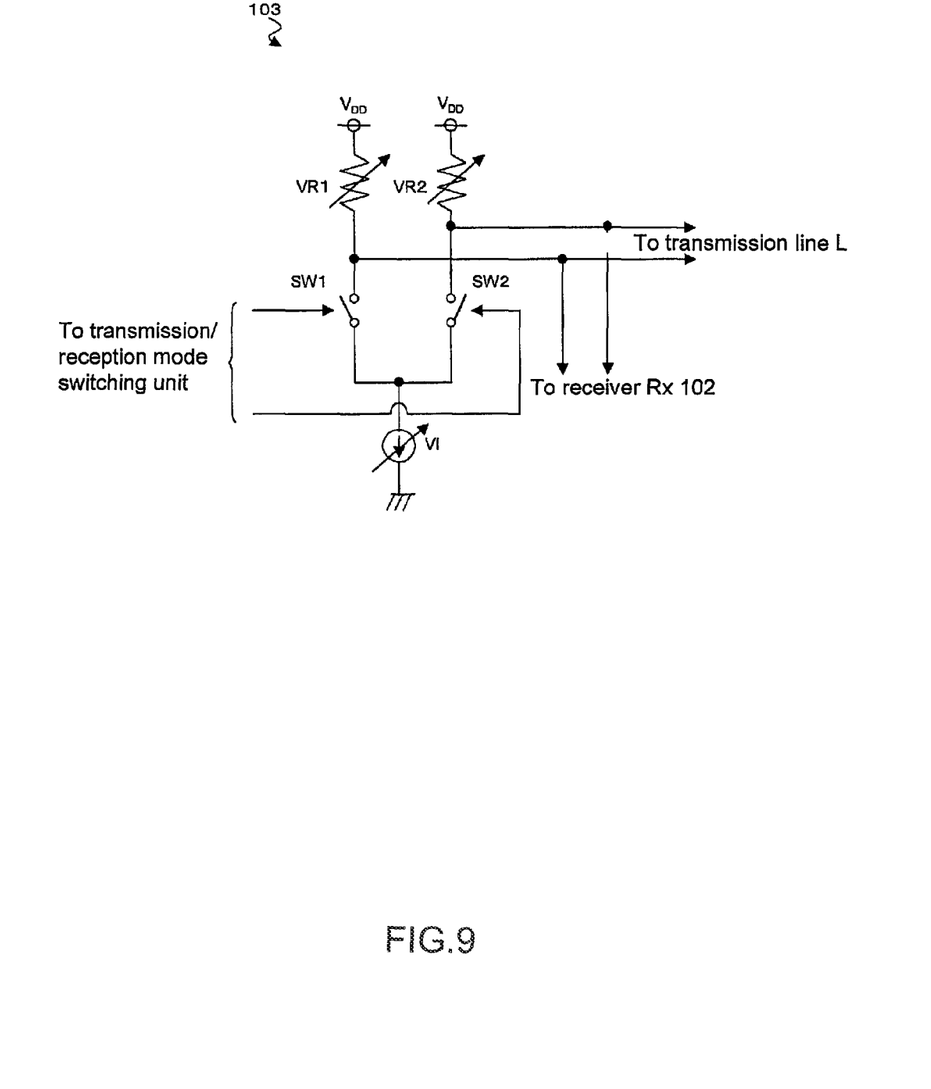
FIG. 9 is a diagram illustrating the circuit configuration of a transmitter Tx according to a second embodiment of the present invention.

A second embodiment of the present invention is characterized in that the resistors and current source of a transmitter Tx 103 are variable so that they can be matched with the characteristic impedance on a transmission line L. In accordance with the second embodiment of the present invention, an example in which the resistors R1 and R2 of the transmitter Tx 101 illustrated in FIG. 5 are formed of variable resistors and the current source I of the transmitter Tx 101 illustrated in FIG. 5 is formed of a variable current source is illustrated in FIG. 9. Furthermore, since the transmitter Tx 103 illustrated in FIG. 9 has the same configuration as the transmitter Tx 101 illustrated in FIG. 5 except for the variable resistors VR1 and VR2 and the variable current source VI, the same numerals are assigned to corresponding components and descriptions thereof will be omitted here.

The resistance values of the variable resistors VR1 and VR2 of the transmitter Tx 103 illustrated in FIG. 9 are changed by an external control unit when they are matched with the impedance of the transmission line L. Furthermore, the current value of the variable current source VI of the transmitter Tx 103 is changed by the external control unit in response to the changes in the resistance values of the variable resistors VR1 and VR2. Here, the resistance values of the variable resistors VR1 and VR2 and the current value of the variable current source VI vary by the same ratio.

The transmitter Tx 103 illustrated in FIG. 9 is formed of the variable resistors VR1 and VR2 and the variable current source VI, thereby being able to vary the respective resistance values and the current value in the same ratio in response to a change in the impedance characteristic of the transmission line L (the length and quality of the transmission line L, an impedance value within a communication device, etc.) that connects the transmitter Tx 103 and the receiver Rx 102 with each other. As a result, it is possible to achieve impedance matching by adjusting the variable resistors VR1 and VR2 and variable current source VI of the transmitter Tx 103 in response to a change in the characteristic impedance on the transmission line L. Furthermore, the intermediate electric potential can be maintained without changing the voltage division ratio of the resistance circuit including the variable resistor VR1 and the variable resistor VR2 by varying the variable resistors VR1 and VR2 and the variable current source VI by the same ratio. Although only the case where the circuit of FIG. 9 has been applied to the transmitter Tx 103 is illustrated in the second embodiment of the present invention, this can be also applicable to the transmitter Tx 201.

As described above, the transmitter Tx 103 of the second embodiment can easily adjust the impedance of the communication device in response to a change in the characteristic impedance of the transmission line L using the variable resistors VR1 and VR2 and the variable current source VI. Furthermore, the intermediate electric potential to be supplied to respective lines of the transmission line L and the receivers Rx 102 and 202 can be maintained without changing the voltage division ratio of the resistance circuit including the variable resistors VR1 and VR2 by variably adjusting the variable resistors VR1 and VR2 and the variable current source VI by the same ratio. As a result, stabilization operations at the receivers Rx 102 and 202 can be maintained.

(Third Embodiment)

Figure 10:
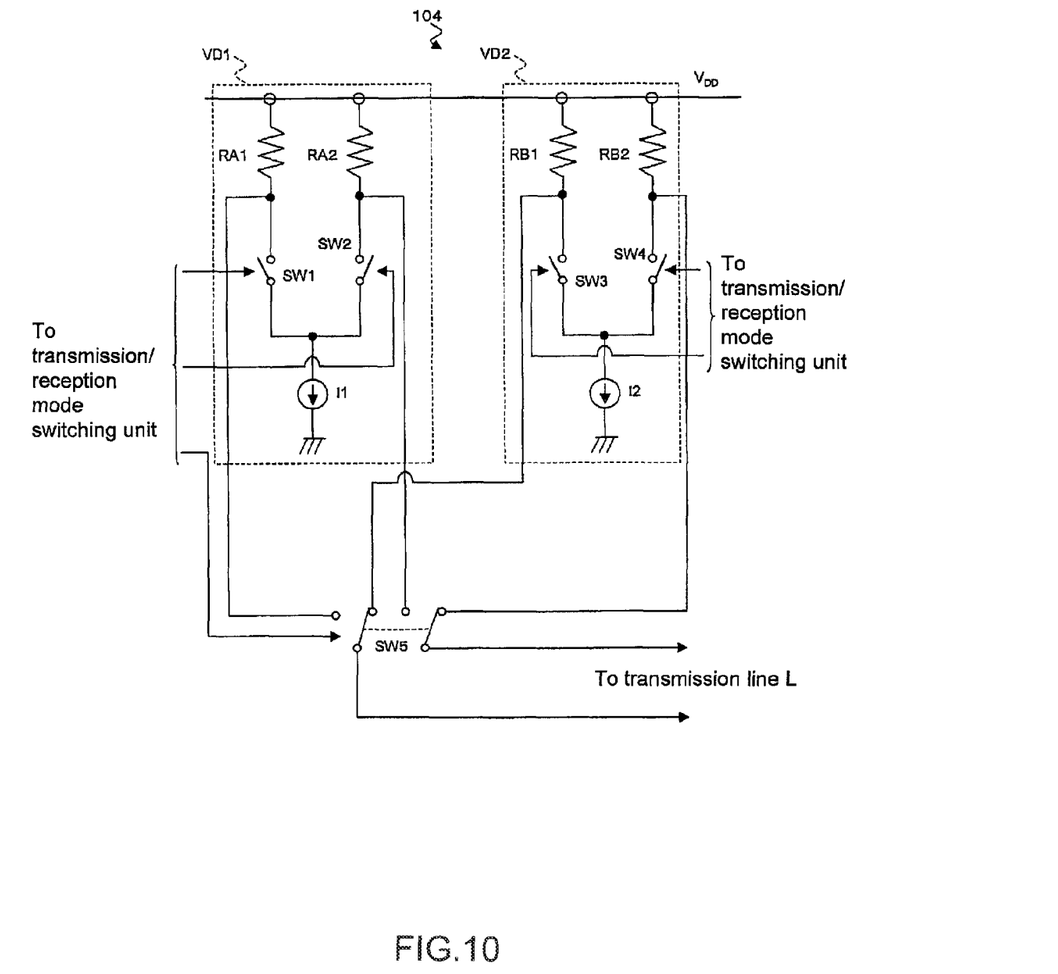
FIG. 10 is a diagram illustrating the circuit configuration of a transmitter Tx according to a third embodiment of the present invention.

A third embodiment of the present invention is characterized in that a transmission line L switches between combinations of a plurality of resistors having different resistance values and a plurality of current sources having different current values in a transmitter Tx to be matched with the characteristic impedance on a transmission line L. FIG. 10 is a diagram illustrating the circuit configuration of a transmitter Tx 104 according to the third embodiment of the present invention. Referring to FIG. 10, the transmitter Tx 104 includes a voltage division circuit VD1 and a voltage division circuit VD2. The voltage division circuit VD1 includes resistors RA1 and RA2, switches SW1 and SW2, and a current source 11, and the voltage division circuit VD2 includes resistors RB1 and RB2, switches SW3 and SW4, and a current source 12. Furthermore, a switch SW5 that connects either the voltage division circuit VD1 or voltage division circuit VD2 to the transmission line L using a switching operation is connected to respective output terminals of the voltage division circuits VD1 and VD2. The switch SW5 operates in response to a change in the characteristic impedance on the transmission line L, thereby connecting the voltage division circuit VD1 or VD2 to the transmission line L.

The resistors RA1 and RA2 of the voltage division circuit VD1 have the same resistance value. Furthermore, the resistors RB1 and RB2 of the voltage division circuit VD2 also have the same resistance value. However, the resistance value of the resistors RA1 and RA2 and the resistance value of the resistors RB1 and RB2 are set to a specific ratio so that they are matched with a specific characteristic impedance on the transmission line L. For example, the resistance value of the resistors RA1 and RA2 and the resistance value of the resistors RB1 and RB2 are set to a specific ratio so that when the resistance value of the resistors RA1 and RA2 is set to "1," the resistance value of the resistors RB1 and RB2 is set to "½."

The transmitter Tx 104 illustrated in FIG. 10 operates the switch SW5 in response to a change in the characteristic impedance on the transmission line L, thereby connecting the voltage division circuit VD1 or voltage division circuit VD2 to the transmission line L. Since a switch to the voltage division circuit VD1 or voltage division circuit VD2 is performed by the switch SW5 in response to a change in the characteristic impedance of the transmission line L, the voltage division ratio of each resistance circuit including the resistors RA1 and RA2 or resistors RB1 and RB2 is not changed, thereby being able to maintain the intermediate electric potential. Furthermore, the transmitter Tx 104 is applicable to the transmitters Tx 101 and 201 illustrated in FIG. 4.

As described above, the transmitter Tx 104 of the third embodiment connects either of the voltage division circuits VD1 and VD2 having different resistance values and current values to the transmission line L using a switching operation in response to a change in the characteristic impedance of the transmission line L, thereby being able to easily adjust the impedance of the communication device. Furthermore, the resistance values of the resistors RA1 and RA2 of the voltage division circuit VD1 and the resistance values of the resistors RB1 and RB2 of the voltage division circuit VD2 are set to values that do not change their voltage division ratio. On this account, the intermediate electric potential to be supplied to respective lines of the transmission line L and the receivers Rx 102 and 202 can be maintained. As a result, the stabilization operations of the receivers Rx 102 and 202 can be maintained. Furthermore, although the example in which two voltage division circuits, that is, the voltage division circuit VD1 and the voltage division circuit VD2, are provided in the transmitter Tx 104 is illustrated in FIG. 10, the present invention is not limited thereto, but three or more voltage division circuits having the same configuration may be provided. That is, the number of voltage division circuits may vary with the specifications of the communication device.

Figure 11:
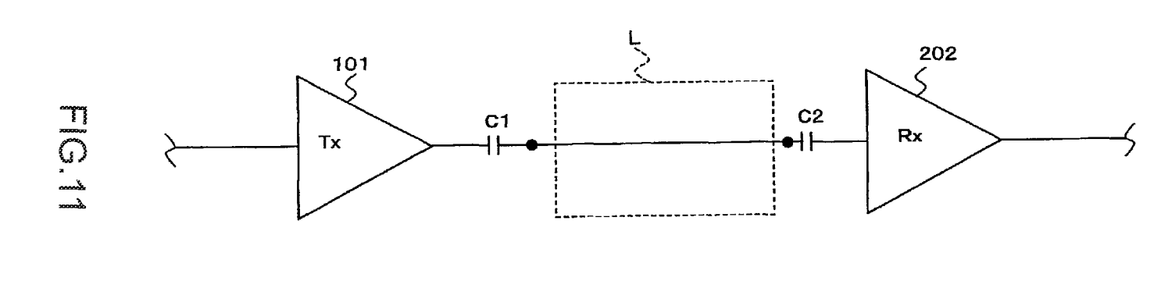
FIG. 11 is a diagram illustrating the schematic configuration of a data communication system according to another embodiment of the present invention.

Furthermore, although the cases where the communication devices E1 and E2 has been applied to the two-wire transmission line L have been illustrated in the embodiments 1~3 of the present invention, the circuit configurations of the transmitter Tx and the receiver Rx illustrated in the embodiments 1~3 of the present invention may be applied to a single-wire transmission line L illustrated in FIG. 11. Furthermore, the circuit configurations of the transmitter Tx and the receiver Rx illustrated in the embodiments 1~3 of the present invention may be applied to a transmission line L having two or more lines.

Furthermore, although the switches SW have been applied to the circuit configurations of the transmitters Tx illustrated in embodiments 1~3 of the present invention, semiconductor switching devices, such as transistors, may be employed instead of the switches SW. In this case, the semiconductor switching devices may perform an ON/OFF operation in response to individual logic signals that are output from the transmission/reception mode switching unit 112 or the like. Accordingly, the switch operation in the transmitter Tx in the idle state may be controlled using such semiconductor switching devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data transmission circuit comprising:
a data transmission unit for transmitting data via a transmission line having a single Alternating Current (AC)-coupled line or a plurality of AC-coupled lines;
wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential, and maintains the intermediate electric potential until the data transmission has been resumed.

2. The data transmission circuit of claim 1,
wherein the data transmission unit comprises:
a plurality of resistors configured such that first ends of the plurality of resistors are connected to a power source and second ends of the plurality of resistors are connected to the transmission line,
a plurality of switches connected to the second ends of the plurality of resistors, and
a current source connected to the second ends of the plurality of resistors via the plurality of switches; and
wherein the data transmission unit:
when transmitting the data, sequentially connects the second ends of the plurality of resistors to the current source by sequentially closing the plurality of switches and transmits the data via the transmission line by sequentially setting a first electric potential and a second electric potential different from the first electric potential;
when transitioning from the data transmission mode to the idle state, connects the second ends of the plurality of resistors to the current source by closing the plurality of switches together, and sets an electric potential of the second ends of the plurality of resistors to the intermediate electric potential and supplies the intermediate electric potential to the transmission line.

3. A data transmission circuit comprising:
a data transmission unit for transmitting normal and reversed phase differential data via a differential transmission line having two AC-coupled lines;
wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential, and maintains the intermediate electric potential until the data transmission has been resumed.

4. The data transmission circuit of claim 3,
wherein the data transmission unit comprises:
two resistors configured such that first ends of the two resistors are connected to a power source and second ends of the two resistors are connected to the differential transmission line,
two switches connected to the second ends of the two resistors, respectively, and
a current source connected to the second ends of the two resistors via the two switches; and
wherein the data transmission unit:
when transmitting the data, alternatively connects the second ends of the two resistors to the current source by alternatively closing the two switches, and transmits the data via the differential transmission line using a differential operation of alternately setting a first electric potential and a second electric potential different from the first electric potential, and
when transitioning to the idle state, connects the second ends of the two resistors to the current source by closing the two switches together, and sets an electric potential of the second ends of the two resistors to the intermediate electric potential and supplies the intermediate electric potential to respective lines of the differential transmission line.

5. The data transmission circuit of claim 4,
wherein the two switches are two semiconductor devices that switch between open and closed states in response to individual logic signals; and
wherein the data transmission unit:
when transmitting the data, alternatively connects the second ends of the two resistors to the current source by alternatively closing the two semiconductor devices in response to the individual logic signals, and transmits the data via the differential transmission line using a differential operation of alternately setting the first electric potential and the second electric potential, and
when transitioning to the idle state, connects the second ends of the two resistors to the current source by closing the two semiconductor devices together in response to the individual logic signals, and supplies the electric potential between the first electric potential and the second electric potential, obtained by the two resistors, to the respective lines of the differential transmission line.

6. The data transmission circuit of claim 4, wherein each of the two resistors is a variable resistor having a variable resistance value.

7. The data transmission circuit of claim 4, wherein the current source is a variable current source having a variable current value.

8. A data communication device comprising:
a data transmission circuit comprising a data transmission unit for transmitting data via a transmission line having a single AC-coupled line or a plurality of AC-coupled lines, and a data reception circuit comprising a data reception unit for receiving data via the transmission line;
wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential and supplies the intermediate electric potential to the transmission line and the data reception unit, and maintains the intermediate electric potential until the data transmission has been resumed.

9. The data communication device of claim 8,
wherein the data transmission unit comprises:
a plurality of resistors configured such that first ends of the plurality of resistors are connected to a power source and second ends of the plurality of resistors are connected to the transmission line,
a plurality of switches connected to the second ends of the plurality of resistors, and
a current source connected to the second ends of the plurality of resistors via the plurality of switches;
wherein the data reception unit comprises:
a buffer configured such that input terminals of the buffer are connected to the transmission line; and wherein the data transmission circuit:
when transmitting the data, sequentially connects the second ends of the plurality of resistors to the current source by sequentially closing the plurality of switches and transmits the data via the transmission line by sequentially setting a first electric potential and a second electric potential different from the first electric potential, and
when transitioning from the data transmission mode to the idle state, connects the second ends of the plurality of resistors to the current source by closing the plurality of switches together, and sets an electric potential of the second ends of the plurality of resistors to the intermediate electric potential, and supplies the intermediate electric potential to the transmission line and the input terminals of the buffer.

10. A data communication device comprising:
a data transmission circuit comprising a data transmission unit for transmitting normal and reversed phase differential data via a differential transmission line having two AC-coupled lines, and a data reception circuit comprising a data reception unit for receiving data via the differential transmission line;
wherein the data transmission unit, when transmitting data, transmits the data via the transmission line by sequentially setting a first electric potential corresponding to the data and a second electric potential different from the first electric potential, and, when transitioning from data transmission mode to an idle state, sets an intermediate electric potential between the first electric potential and the second electric potential and supplies the intermediate electric potential to the differential transmission line and the data reception unit, and maintains the intermediate electric potential until the data transmission has been resumed.

11. The data communication device of claim 10,
wherein the data transmission unit comprises:
two resistors configured such that first ends of the two resistors are connected to a power source and second ends of the two resistors are connected to the differential transmission line,
two switches connected to the second ends of the two resistors, respectively, and
a current source connected to the second ends of the two resistors via the two switches;
wherein the data reception unit comprises:
a buffer configured such that input terminals of the buffer are connected to the differential transmission line; and
wherein the data transmission unit:
when transmitting the data, alternatively connects the second ends of the two resistors to the current source by alternatively closing the two switches, and transmits the data via the differential transmission line using a differential operation of alternately setting a first electric potential and a second electric potential different from the first electric potential, and
when transitioning from the data transmission mode to the idle state, connects the second ends of the two resistors to the current source by closing the two switches together, and sets an electric potential of the second ends of the two resistors to the intermediate electric potential, and supplies the intermediate electric potential to respective lines of the differential transmission line and the input terminals of the buffer.

12. The data communication device of claim 11,
wherein the two switches are two semiconductor devices that switch between open and closed states in response to individual logic signals; and
wherein the data transmission unit:
when transmitting the data, alternatively connects the second ends of the two resistors to the current source by alternatively closing the two semiconductor devices in response to the individual logic signals, and transmits the data via the differential transmission line using a differential operation of alternately setting the first electric potential and the second electric potential, and
when transitioning from the data transmission mode to the idle state, connects the second ends of the two resistors to the current source by closing the two semiconductor devices together in response to the individual logic signals, and supplies the electric potential between the first electric potential and the second electric potential, obtained by the two resistors, to the respective lines of the differential transmission line.

13. The data communication device of claim 11, wherein each of the two resistors is a variable resistor having a variable resistance value.

14. The data communication device of claim 11, wherein the current source is a variable current source having a variable current value.

* * * * *